United States Patent
Adams

(10) Patent No.: US 7,421,493 B1
(45) Date of Patent: Sep. 2, 2008

(54) ORPHANED NETWORK RESOURCE RECOVERY THROUGH TARGETED AUDIT AND RECONCILIATION

(75) Inventor: Mark Adams, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 936 days.

(21) Appl. No.: 10/424,626

(22) Filed: Apr. 28, 2003

(51) Int. Cl.
G06F 15/173 (2006.01)
(52) U.S. Cl. ..................................... 709/224
(58) Field of Classification Search ............... 709/223, 709/224, 226; 714/4, 45, 47; 455/435.1; 370/254
See application file for complete search history.

(56) References Cited

U.S. PATENT DOCUMENTS

| | | | |
|---|---|---|---|
| 5,737,319 A * | 4/1998 | Croslin et al. ............... | 370/255 |
| 5,761,502 A | 6/1998 | Jacobs | |
| 5,819,019 A * | 10/1998 | Nelson .......................... | 714/4 |
| 5,821,937 A * | 10/1998 | Tonelli et al. ................ | 715/853 |
| 5,848,243 A | 12/1998 | Kulkarni et al. | |
| 5,922,079 A | 7/1999 | Booth et al. | |
| 6,058,426 A | 5/2000 | Godwin et al. | |
| 6,170,011 B1 | 1/2001 | Macleod Beck et al. | |
| 6,223,219 B1 | 4/2001 | Uniacke et al. | |
| 6,229,540 B1 * | 5/2001 | Tonelli et al. ............... | 715/735 |
| 6,263,314 B1 | 7/2001 | Donner | |
| 6,347,374 B1 | 2/2002 | Drake et al. | |
| 6,363,421 B2 | 3/2002 | Barker et al. | |
| 6,381,250 B1 | 4/2002 | Jacobson et al. | |
| 6,385,609 B1 | 5/2002 | Barshefsy et al. | |
| 6,385,652 B1 | 5/2002 | Brown et al. | |
| 6,393,425 B1 * | 5/2002 | Kelly ........................... | 707/100 |

(Continued)

OTHER PUBLICATIONS

U.S. Appl. No. 10/400,112; Mark Adams; *Filtering Approach for Network System Alarms;*; filed Mar. 26, 2003; Specification 27 pages (including title page) and 1 drawing page.

(Continued)

*Primary Examiner*—Andrew Caldwell
*Assistant Examiner*—Benjamin A Ailes

(57) ABSTRACT

A method of recovering orphaned network resources in a network service having a network model. An audit state for each resource of the network service that is included in the network model can be identified. The audit states can include confirmed, unconfirmed, and suspect. The confirmed audit state indicates that evidence has been gathered for a resource of the network service that verifies the accuracy of the network model, the suspect audit state indicates that evidence has been gathered for a resource of the network service that challenges the accuracy of the network model, and the unconfirmed audit state indicates that no evidence has yet been gathered to indicate a resource of the network service as confirmed or suspect. The audit state for each resource can be stored and this information can be coupled with other information regarding the resource. The network service can be redesigned using only resources with a confirmed audit state and then reconfigured to correspond with the redesign. Resources with a confirmed audit state that were not used in the reconfigured network service can be made available for reuse. Resources that had a suspect audit state in the network service before the reconfiguration of the network service and that are not used in the reconfigured network service can be identified as orphans. Orphan recovery procedures can be performed on the orphans.

22 Claims, 1 Drawing Sheet

U.S. PATENT DOCUMENTS

| | | | |
|---|---|---|---|
| 6,401,120 | B1 | 6/2002 | Gamache et al. |
| 6,457,050 | B1 | 9/2002 | Cowan et al. |
| 6,470,388 | B1 | 10/2002 | Niemi et al. |
| 6,530,024 | B1 | 3/2003 | Proctor |
| 6,532,554 | B1 | 3/2003 | Kakadia |
| 6,598,184 | B1 | 7/2003 | Merget et al. |
| 6,697,087 | B1 * | 2/2004 | Kelly ........................ 715/735 |
| 6,732,299 | B1 | 5/2004 | Mbarki |
| 6,775,552 | B2 | 8/2004 | Link, II |
| 6,775,701 | B1 | 8/2004 | Pan et al. |
| 6,789,257 | B1 * | 9/2004 | MacPhail ................... 719/316 |
| 6,834,304 | B1 | 12/2004 | Nisbet et al. |
| 6,836,798 | B1 | 12/2004 | Adams |
| 6,847,996 | B2 | 1/2005 | Brunet et al. |
| 6,865,517 | B2 | 3/2005 | Bantz et al. |
| 6,895,529 | B2 | 5/2005 | Egolf et al. |
| 6,920,506 | B2 | 7/2005 | Barnard et al. |
| 6,950,865 | B1 * | 9/2005 | Depaolantonio ............ 709/223 |
| 6,981,039 | B2 | 12/2005 | Cerami et al. |
| 7,058,861 | B1 | 6/2006 | Adams |
| 7,349,961 | B2 * | 3/2008 | Yamamoto .................. 709/224 |
| 2002/0010767 | A1 | 1/2002 | Farrow et al. |
| 2002/0013702 | A1 | 1/2002 | Lee et al. |
| 2002/0103901 | A1 | 8/2002 | Yoshida |
| 2002/0116485 | A1 | 8/2002 | Black et al. |
| 2002/0147801 | A1 | 10/2002 | Gullotta et al. |
| 2002/0157035 | A1 * | 10/2002 | Wong et al. .................... 714/4 |
| 2003/0005102 | A1 * | 1/2003 | Russell ....................... 709/223 |
| 2003/0005331 | A1 | 1/2003 | Williams |
| 2003/0135382 | A1 | 7/2003 | Marejka et al. |
| 2003/0158765 | A1 * | 8/2003 | Ngi et al. ....................... 705/7 |
| 2004/0003078 | A1 | 1/2004 | Todd et al. |
| 2004/0098474 | A1 | 5/2004 | Galou et al. |
| 2004/0107277 | A1 | 6/2004 | Levesque et al. |
| 2004/0122926 | A1 | 6/2004 | Moore et al. |
| 2005/0076394 | A1 * | 4/2005 | Watson et al. ............... 725/151 |

OTHER PUBLICATIONS

U.S. Appl. No. 10/335,466; Mark Adams; *Network Model Audit and Reconciliation Using State Analysis*; filed Dec. 31, 2002; Specification 33 pages (including title page) and 1 drawing page.

U.S. Appl. No. 10/335,321; Mark Adams; *Network Model Reconciliation Using State Analysis*; filed Dec. 31, 2002; Specification 35 pages (including title page) and 1 drawing page.

Grillo, et al., "Teletraffic Engineering for Mobile Personal Communications in ITU-T Work: The Need to Match Practice and Theory," IEEE 1998, pp. 38-58.

Glitho, Roch H., "Isolating Faulty Routing Tables in SS7 Networks: Present and Future", IEEE 1996, pp. 98-104.

Cohn, Nathan, "Auditing Control Performance of Interconnected Areas Utilizing the Component Concept and its Decomposition and Evaluation Techniques, Part I: Audit Technology and Field Test", IEEE 1988, pp. 581-587.

Israel, R., et al., "Configuration Management of Large IP Telephony Networks", IEEE, 2000, pp. 435-446.

Lee, et al., "Information-Theoretic Measures for Anomaly Detection", IEEE 2001, pp. 130-143.

Office Action dated Sep. 8, 2006, 15 pages, U.S. Appl. No. 10/400,112, filed Mar. 26, 2003.

Final Office Action dated Feb. 22, 2007, 17 pages, U.S. Appl. No. 10/400,112, filed Mar. 26, 2003.

Advisory Action dated Apr. 27, 2007, 3 pages, U.S. Appl. No. 10/400,112, filed Mar. 26, 2003.

Office Action dated Aug. 8, 2007, 17 pages, U.S. Appl. No. 10/400,112, filed Mar. 26, 2003.

Office Action dated Sep. 8, 2006, 13 pages, U.S. Appl. No. 10/4000,111, filed Mar. 26, 2003.

Office Action dated Mar. 7, 2007, 17 pages, U.S. Appl. No. 10/4000,111, filed Mar. 26, 2003.

Final Office Action dated Aug. 22, 2007, 18 pages, U.S. Appl. No. 10/4000,111, filed Mar. 26, 2003.

Adams, Mark, Patent Application entitled "Filtering Approach for Network System Alarms Based on Lifecycle State", filed Mar. 26, 2003, U.S. Appl. No. 10/400,111.

* cited by examiner

ORPHANED NETWORK RESOURCE RECOVERY THROUGH TARGETED AUDIT AND RECONCILIATION

CROSS-REFERENCE TO RELATED APPLICATIONS

This application has subject matter related to U.S. patent application Ser. No. 10/400,112, filed Mar. 26, 2003 and entitled "Filtering Approach for Network System Alarms" which is incorporated herein by reference. This application is has subject matter also related to U.S. patent application Ser. No. 10/335,466, filed Dec. 31, 2002 now U.S. Pat. No. 7,058,861 issued Jun. 6, 2006 and entitled "Network Model Audit and Reconciliation Using State Analysis" and to U.S. patent application Ser. No. 10/335,321, filed Dec. 31, 2002 now U.S. Pat. No. 6,836,798 issued Dec. 28, 2004 and entitled "Network Model Reconciliation Using State Analysis", both of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the auditing of the configuration of resources in a network. More particularly, embodiments of the present invention provide a method for identifying and recovering network resources that have ceased to be used productively because of discrepancies between a network and a model of that network used to make management decisions.

BACKGROUND OF THE INVENTION

Elements in computer and telecommunications networks are sometimes interconnected in highly complex configurations. To aid in the management of such networks, models are sometimes created that are intended to list all elements in a network and record the ways in which they are interconnected. As used herein, the term element refers to a large-scale physical device such as a switch or a router. The word component refers to a physical or logical part of an element such as a circuit card within a switch. The term resource is used generically to refer to an element, a component, a physical port within an element, a logical decomposition within a port such as a wavelength assigned to an optical port, or any unit within a network that can provide information about itself. A list of resources in use and/or available for use in a network can be referred to as an inventory. A description of the ways resources are configured, such as their assigned usage, the other resources to which they are connected, and their relationships to other resources, can be referred to as a topology. Collectively, an inventory and its associated topology constitute a network model. Changes can occur over time in both an actual network and in a network model representing that network. Ideally, every change in the actual network is matched by an equivalent, corresponding change in the network model. However, discrepancies can occur that cause a network model to no longer accurately depict the network it is intended to describe. This can decrease the effectiveness of the network model as a tool used in managing the network.

The sources of such a misalignment between a network model and an actual network can be placed into two categories, process, or human-related, gaps and system gaps. Process gaps can include a failure to properly record the installation or removal of an element, failure to properly record changes to an element, failure to properly record changes to the links interconnecting network elements, failure to record or restore emergency network repairs, human errors and deviations from defined operational processes, operational process deficiencies in the handoff of work between administrative units, operational process deficiencies in handling exceptional conditions, and intentionally deceptive use of network resources. System gaps can include a lack of automated coordination between interdependent models, deficiencies in exchanging information among interdependent models, software defects that corrupt or fail to properly update data records, and system failures that corrupt data records.

Auditing of network elements can be done to discover possible misalignments between a network model and an actual network. A comprehensive audit and reconciliation approach can be defined as having three portions. The auditing process can be defined as the collection of information about the actual status and configuration of network elements and components at a particular moment in time. The comparison process can be defined as the comparison of this actual information to the network model and the documentation of discrepancies between them. The reconciliation process can be defined as the resolution and corresponding elimination of the documented discrepancies between the actual information about the network and the network model.

Traditionally, auditing has been done by periodically querying network elements. Each element thought to be present on a network can be periodically checked by the sending of one or more verifying queries to the element. The queries are intended to invoke replies back from the element providing descriptive information to the originator so that a comparison can be made between the network model and the element's interpreted responses. At a minimum, a response confirms the existence of an element. The content of a response can provide additional detail that can confirm or challenge specific details within a network model. A lack of a response raises a caution. For example, an audit system can use a mechanism such as the Internet Protocol "ping" command as an existence checking function. However, evidence that an element exists at a particular network address does not necessarily provide information regarding what type of element it is, how it is structured, what type of interface it supports, or how its interfaces are configured. In other query techniques, various standard protocols can be used to determine how an element responds. These additional responses received from the element can provide evidence of its identity, structure, and status. Based on the responses received, additional queries may be sent to the element to retrieve more information.

Information obtained from querying a network element can be compared to a network model. An element whose identify, structure, or status in the actual network differs from its identify, structure, or status in the network model can be referred to as a disputed resource. When an audit indicates that a disputed resource exists, the discrepancy has traditionally been recorded and reported for later resolution. Traditional resolution techniques have relied primarily on precedence rules ascribing a higher importance to either the actual network configuration (in which case, the network model is changed to match the network) or to the network model (in which case, the network itself is changed to match the network model).

In the normal course of operating a network, many different types of information about the configuration of elements of the network are created and distributed. Existing approaches to validating the accuracy of a network model do not make use of all available information types and methods of audit and reconciliation. The traditional audit and reconciliation technique is episodic and does not easily support a continuous audit and reconciliation process. Since an audit state model is not integrated with current inventory and topology models, the analysis of trends in the accuracy of a network model is not easily accomplished.

SUMMARY OF THE INVENTION

An embodiment of the invention is a method of recovering orphaned network resources in a network service having a network model. The method can consist of identifying an audit state for each resource of the network service that is included in the network model. The possible audit states can include confirmed, unconfirmed, and suspect. The audit state for each resource can be stored and the stored audit state information can be coupled with information regarding the resource associated with the network model. The network service can be redesigned using only resources with a confirmed audit state and then reconfigured to correspond with the redesign. Resources with a confirmed audit state that were not used in the reconfigured network service can be made available for reuse. Resources that had a suspect audit state in the network service before the reconfiguration of the network service and that are not used in the reconfigured network service can be identified as orphans. Any or all of a group of orphan recovery procedures including monitoring network traffic through an orphan, quarantining an orphan, monitoring alarm patterns related to an orphan, and checking the loop-back status of an orphan can then be performed on the orphans. The monitoring of alarm patterns related to an orphan can further include monitoring maintenance and troubleshooting activities related to the orphan. Checking the loop-back status of an orphan can further include checking maintenance and troubleshooting activities related to the orphan. The orphan recovery procedures can be automated or can require human intervention. Orphans that automated orphan recovery procedures determine to be inactive can be made available for other use while orphans that orphan recovery procedures determine to be active can be left in service. The orphan recovery method can further consist of identifying another network service to which an active orphan belongs, redesigning the other network service without the orphan, reconfiguring the other network service without the orphan, performing orphan recovery procedures on the orphan, and making the orphan available for other use when orphan recovery procedures determine the orphan to be inactive and leaving the orphan in service when orphan recovery procedures determine the orphan to be active. These steps can be repeated until the orphan is made available for other use. Orphan recovery procedures can also include direct one-to-one intervention to inspect orphans that automated orphan recovery procedures cannot determine to be active or inactive as well as performing a physical inspection of orphans that orphan recovery procedures cannot determine to be active or inactive. Orphans that physical inspection determines to be inactive can be made available for other use and orphans that physical inspection determines to be active can be left in service.

In an alternative embodiment, the method of recovering orphaned network resources in a network having a network model consists of identifying an audit state for each resource of the network service that is included in the network model where the possible audit states comprise confirmed, unconfirmed, and suspect; storing the audit state for each resource and coupling the stored audit state information with information regarding the resource associated with the network model; identifying at least one network service using at least one resource with a suspect audit state; redesigning the network service using only resources with a confirmed audit state; reconfiguring the network service to correspond with the redesign; making available for reuse resources with a confirmed audit state that were not used in the reconfigured network service; identifying as orphans resources that had a suspect audit state in the network service before the reconfiguration of the network service and that are not used in the reconfigured network service; and performing orphan recovery procedures on the orphans. The orphan recovery procedures can include monitoring network traffic through the orphan, quarantining the orphan, monitoring alarm patterns related to the orphan, and checking the loop-back status of the orphan. The identifying of at least one network service using at least one resource with a suspect audit state can include identifying a resource with a suspect audit state being used by multiple network services and identifying all of the network services using the identified suspect resource. Redesigning a network service can include redesigning a first identified network service using only resources with a confirmed audit state. Reconfiguring a network service can include reconfiguring the first identified network service to correspond with the redesign. Additional identified network services can be individually redesigned and reconfigured using the identified suspect resource until the suspect resource is recovered. Alternatively, redesigning can consist of redesigning all of the identified network services using only resources with a confirmed audit state and reconfiguring can consist of reconfiguring all of the identified network services to correspond with the redesign. The orphan recovery method can be repeated until no network services remain which use a suspect resource. Alternatively, the method can be repeated until the aggregate audit state is below a predefined threshold.

DETAILED DESCRIPTION OF THE PREFERRED EMBODIMENTS

Figure 1:
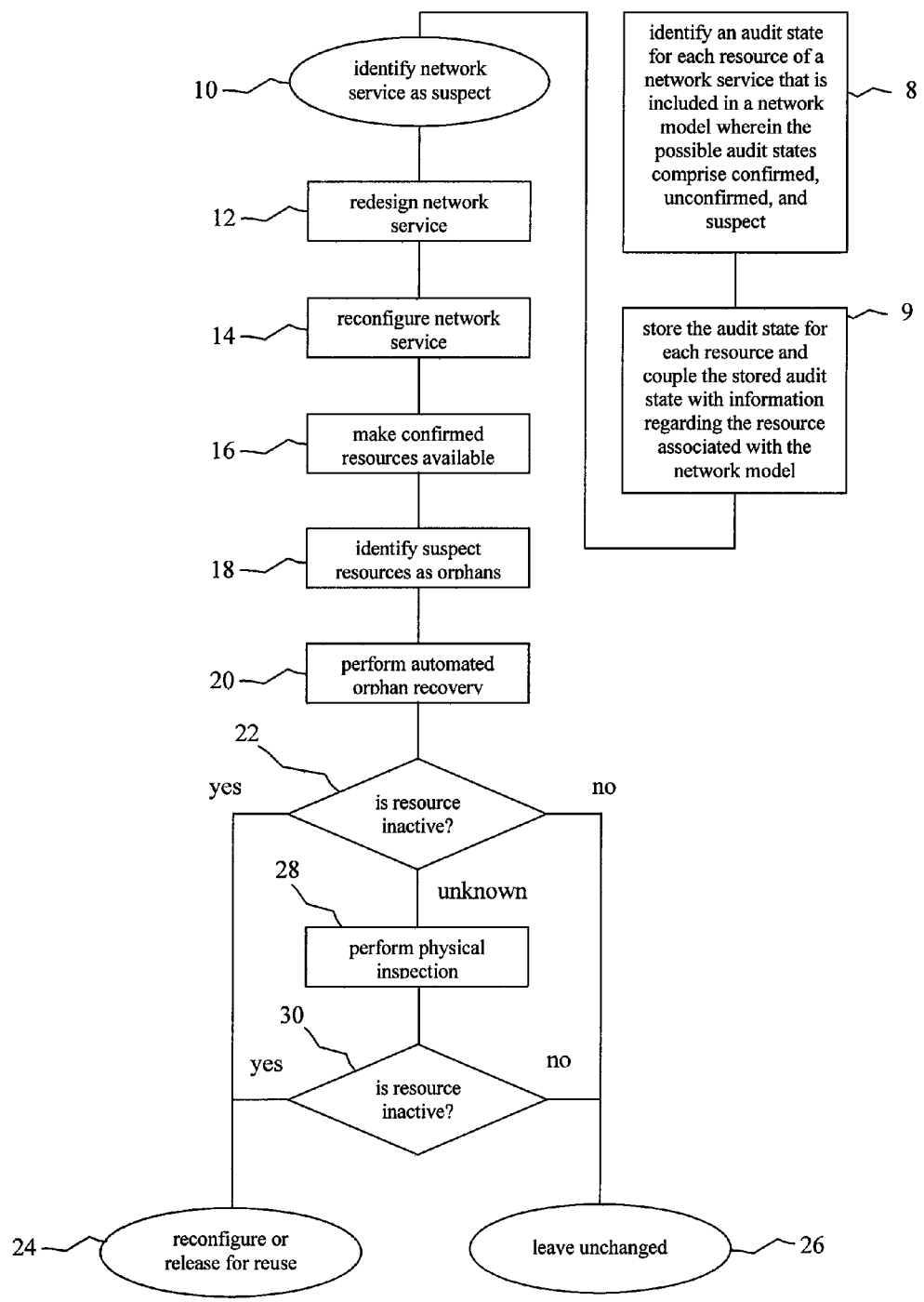
FIG. 1 is a flow chart depicting an embodiment of the orphaned network resource recovery process.

A set of defined "audit" states can be used to improve the auditing process and the management of inventory and topology and to facilitate the reconciliation of discrepancies between a network model and an actual network. The use of these audit states can aid in pinpointing sources and causes of specific network changes, troubleshooting configuration problems, recovering lost network resources, identifying and correcting gaps in operational processes, improving data accuracy within network models, restoring corrupted or sabotaged network services, identifying covert network resource uses, speeding service delivery through improved automation, reducing service delivery rework, accelerating problem repair, and reducing the overall number of service problems.

The alignment or misalignment of a network model with the network it is intended to depict can be discovered through the comparison process described above based on one of several audit methods. First, a command and control process can be used wherein an element is given specific instructions to change its configuration or reallocate its resources. The element can then return to the originator of the configuration command either synchronous or asynchronous confirmation of the success or failure of the command. This configuration command response can provide information to an audit system about the element's status, either directly or through implication. In the case of a successful receipt of a configuration command response, the originator of the command can forward the confirmation information contained in the response to the audit system. In the case of configuration command failure, the element or a mediator can determine the cause of the failure and forward the relevant information to the audit system.

Several specific scenarios must be accounted for in the case of configuration command failure. In cases where no response is received from an element, the existence of that element is challenged but no final conclusions can be drawn as other factors such as temporary loss of network connectivity could account for the failure. However, the element should be placed on a watch list for more frequent reachability testing until connectivity is restored or more definitive evidence is received. Additionally, a response from an element indicating that a requested component within an element is unknown should be treated as evidence that the component is suspect. Finally, a response from an element that indicates a requested resource is already allocated to some other use should be treated as evidence that the resource is suspect. Additional investigative queries should be made to such an element to determine any other resources that are attached to the initial suspect resource. This can result in uncovering other resources that also need to be marked as suspect. Existing auditing methods that are not directly integrated with element command and control fail to collect this information at the point of failure. This delay in the identification of the problem until a later time when a periodic bulk auditing process can be run increases the difficulty of tracing the root cause of the discrepancy.

In a second audit method, audit information can be gathered through what can be referred to as auxiliary pathways. That is, messages that are being transmitted for other purposes can be captured and used by an audit system. For example, some elements periodically announce their presence and/or status via broadcast messages in a process that can be referred to as element self-announcement. An audit system can listen for these self-announcement messages and use them as the basis for verifying the appropriate resources in a network model. The audit system may also use these messages to trigger additional queries to the reporting element if the broadcast messages do not contain sufficient information to make a valid comparison between the actual network and the model.

Third, some protocols support broadcast-based discovery queries that ask all elements adhering to the protocol standards to report their presence and identity. The responses to these test messages can provide audit information. The use of this type of discovery query may also be referred to as stimulating resource messages which may then be reviewed and interpreted in an audit and reconciliation process. Subsequent queries to specific elements can be performed by an audit system to gain further information. These queries may also be considered efforts to stimulate resource messages, as can any situation where instead of merely passively monitoring for resource messages, an affirmative action is taken to get the resource to send out a resource message which may be analyzed in the audit and reconciliation process.

Fourth, some elements send change messages via the same channels used to report equipment problems, usually only to a specific list of registered locations or listeners. By registering for, listening for, and capturing these messages, an audit system can identify resources that are attached to the network at a particular point in time and can identify specific changes in resource configuration. The identified resources can be checked against the network model to determine if any discrepancies exist between the resources and states recorded in the model and the resources and states identified by the element's unsolicited report.

Fifth, some elements contain internal logs that document changes to the element and its internal components such as configuration changes, periodic performance metrics, alarm records, and security violations. The logs can also identify the person, group, or system that issued a change command and can record the date and time of the change. An audit system can capture and retain these logs and compare the actual element information against the network model. This can aid in identifying element changes that have not been recorded in the network model and in analyzing and remediating deficiencies in the audit system.

Sixth, certain network technologies and protocols transmit data about the source, destination, or intermediate points of communications. An audit system can use this information to check the existence of network elements. This information can also validate the reachability relationships between pairs of network resources. Packet protocols generally represent some portion of source and destination addresses within packet headers. Depending on the technology, these may be end-to-end or hop-to-hop. Flow monitors or probes, often included in networks to support testing and troubleshooting, are devices or software that can decompose individual packets and expose the parameters for examination. Captured address parameters can be used by the audit system to check resource and service records against actual network activity. Missing resources and services may be located as a result. Existing resources and services can be confirmed. Additionally, some topology data can be derived or deduced using this information.

Seventh, technologies that employ routing protocols generally provide sharing of network resource knowledge between elements. Examples include IP routing protocols like Routing Information Protocol, Border Gateway Protocol, ATM Private Network-to-Network Interface, and emerging Optical Transport Network protocols. Elements supporting these protocols contain some range of actual network information gained during normal operations. An audit system can collect this information and compare it against network records. Proper use of this information requires detailed understanding of each protocol and its peculiarities. Additional validation may be required before accepting the information as factual.

Eighth, certain network technologies and protocols support regular exchange of topological information between elements or with a central registry. These records can be used by an audit system to verify topological connections.

Ninth, certain network technologies and protocols provide support for tracing or connectivity validation methods. An audit system can use the data returned from these tools, either invoked specifically to support auditing by simulation or during the course of normal network operations. These can be leveraged either as targeted queries aimed at specific elements or as broad systematic sweeps of address ranges, executed systematically. Address space sweeps require significant controls to prevent discovery beyond appropriate domains of responsibility.

Tenth, testing processes can produce validations of certain topology states. For example, it is possible to put a circuit into a loop-back condition at one end of a connection and have a signal generator at the opposite end send a pattern of digits through the connection. The digits are looped back and returned to the signal generator as though they were generated on the other end. The signal generator can listen for the digits and compare them to what was sent to make sure no changes occurred during transmission. In this way it is possible to confirm that two points are connected to each other. No information about intermediary connections is necessarily obtained, but this technique at least confirms that the two endpoints are connected, if indirectly. Recursively applying this approach to successive pairs of points within the path of a service can be used to systematically validate its topology. This is a regular testing procedure used during service delivery, troubleshooting, and maintenance and repair activities. The results of the testing can be provided to an audit system, which can then leverage the results systematically.

Eleventh, for some types of packet services, an alternate method of verifying logical linkage can be derived from roughly synchronized collection of data at adjacent or synchronized points. When a proper connection exists between two elements, traffic counts at the two points are approximately the same (within expected variances for measurement time variations and in-flight data volumes). In its simplest form, this method can only be used as circumstantial evidence to confirm connections (i.e., the traffic volumes match). It is less useful for disproving connections, as all reasonable accounting of loss must be measured (i.e., congestion, dropped cells along the way, buffer overflows, internal errors, etc.).

Twelfth, certain transmission protocols specify that key errors be propagated by resources along network paths. This increases the likelihood of media or equipment breakage being noticed, even if one or more of the resources closest to the problem is unable to respond or is unmonitored. This also allows breakage information to automatically flow across administrative domains. Resources and services as recorded in system models may be reporting alarms in the network that imply disabled or impaired service, yet the actual service may be measured or reported as unaffected. This inconsistency could indicate discrepancies between the model and the actual network. An audit system can draw conclusions about topology based on the presence or absence of propagated alarms.

Thirteenth, when other audit methods have been exhausted, a resource and its physical connections can be manually inspected. Manual methods include the visual inspection of devices, observation of indicator lights on an element's control panel, physically tracing the wire connections from one element to another, or measuring the signals between two elements using a test set inserted between two devices or at an external test access point. This manually obtained information can be input into the audit system through an appropriate user interface designed for that purpose.

An audit state can be defined as an information attribute that objectively describes the level of confidence held in the accuracy of the representation of a particular resource or relationship within a network model. An audit state can be associated with each individually assignable component within a network element and with each relationship linking assignable components.

Three audit states can be defined: unconfirmed, confirmed, and suspect. The unconfirmed state indicates uncertainty about the accuracy of a network model representation of a resource or relationship. The unconfirmed audit state value implies that the configuration of a resource recorded in a network model is either unknown or is known to have changed by some explicit process, yet no confirming or contradicting evidence has been received from any of the previously described auditing processes. The unconfirmed state is also the initial or default state for all elements in a network model, until some evidence is received. As such, an audit state of unconfirmed does not necessarily imply that an element's status in the network model does not match the actual network configuration. The confirmed state indicates that some confirming evidence has been received from the network that verifies the accuracy of a network model representation of a resource or relationship. The suspect state indicates that some contradictory evidence has been received from the network that challenges the accuracy of a network model representation of a resource or relationship.

The reconciliation process can involve the analysis of the likely causes of discrepancies between a network model and the actual network, the determination of the actions required to correct the discrepancies, the execution of changes in the network and/or model to eliminate the discrepancies, and the adjustment of policies and procedures to prevent future discrepancies. More specifically, reconciliation can be viewed as an effort to realign the network model and the actual network. A reconciliation process may use any of the auditing or testing processes described above as tools to help make decisions on changing the model or the network to bring the two into closer alignment. As a byproduct of reconciliation, the audit state of affected resources should eventually change to confirmed from unconfirmed or suspect.

Several reconciliation analysis methods can be used. First, the resources that a disputed resource is linked to upstream and downstream or at higher and lower service levels can be investigated. Determination of the audit states of these other elements can often reveal the source of a discrepancy. A similar investigation can be performed for a disputed resource within a network model. Another reconciliation analysis method is the comparison of the sequence of actual changes to an element to the sequence of changes recorded in the network model. Noting the source, date, and time of all changes can show the point where the actual network and the network model diverged. As an additional reconciliation method, temporary changes such as those caused by intrusive testing, emergency procedures, and maintenance functions can be recorded so that the actual network can be restored to its original configuration or so that the network model can be modified if the changes become permanent.

A first round of reconciliation can be performed that typically includes non-intrusive actions with a small likelihood of creating negative ramifications. For example, when resources are newly installed, they are placed in the unconfirmed state by default. A simple audit could occur that detects the status of such resources, verifies they are in the status recorded in the network model, and places them in the confirmed state. The aggregate audit state of the network model can then be calculated. This can be a best-case, worst-case, or average aggregate audit state as deemed appropriate by an auditing administrator. The calculated aggregate audit state is compared to a desired minimum level. If the aggregate audit state is at or above the threshold then the network model is considered to be in sufficient agreement with the actual network and the reconciliation process ends. If the aggregate audit state is below the threshold then further reconciliation is needed. In this case, a second round of reconciliation would occur for resources in the unconfirmed or suspect state. This step might include more intrusive types of tests that could require coordination with entities that might be affected by any intrusive tests performed on the resources in question. Practically, this may require delaying intrusive activities until some defined maintenance period. After these reconciliation activities are complete, the aggregate audit state is again calculated. The newly calculated aggregate audit state is then compared to the desired minimum. If the aggregate audit state is at or above the threshold then the reconciliation process ends. If the aggregate audit state is below the threshold then a technician may be sent into the field to perform manual tests on the disputed resources. Practically, the deployment of a technician might depend on the level of resource capacity available. If resource capacity is adequate for current needs, then field reconciliation may be deferred until a constraint develops or until other business needs force a field visit.

While the above discussion describes only two rounds of reconciliation, further reconciliation activities could occur at various points in the process. For example, other reconciliation activities could occur before the second round of reconciliation. These might include processes in which a resource is asked to provide feedback on all of its internal parameters. This information could then be used to reconcile the resource's audit state. The aggregate audit state could be calculated at that point and if it is at or above the minimum the reconciliation process could end. If it is below the minimum then the second-round reconciliation activities described above could be performed and the entire reconciliation process could continue as described above. Also, other reconciliation activities could occur before a technician is dispatched. These might include tests that definitely cause an interruption of service such as putting a resource in a loop-back condition. As described above, the aggregate audit state could be calculated after these tests are done and the reconciliation process could end if the aggregate audit state is at or above the minimum. If the aggregate audit state is below the minimum, a technician could be sent into the field.

In summary, the above discussion is intended to depict a hierarchical process in which a minimally intrusive reconciliation activity is performed at the start. If this activity results in an acceptable aggregate audit state, no further reconciliation is needed. If the aggregate audit state is unacceptable after this first round of reconciliation, another round of reconciliation is performed in which more intrusive testing is done. This process of performing more and more intrusive automated testing and reconciliation continues until an acceptable aggregate audit state is reached. If an acceptable aggregate audit state cannot be achieved through automated testing and reconciliation, a technician is sent into the field to perform field reconciliation.

In some cases it is advantageous to take the approaches and tools described above for auditing and reconciliation in general and apply them in a specific integrated method for accomplishing a goal. One such goal is the recovery of orphaned network resources. As used herein, the terms "orphan", "orphaned", and the like refer to a resource in the suspect audit state for which there is evidence that the resource is not in use. The recovery of an orphan refers to ascertaining that a resource is not in use and then making the resource available for use.

In one embodiment, a systematic reconciliation method for transmission circuits can be used both to correct suspect services and to recover misallocated assets. The method integrates various historically separate network management processes into an integrated system. These processes may include effective redesign of service, reliable activation of services, full auditing and audit state model support, access to current and historical performance data, access to current and historical alarms, ability to effectively filter long-standing alarms from near-term operational views, access to testing capabilities, access to historical test records, access to maintenance plans and records, and access to current and historical trouble reports. Using this method, transmission resources can be systematically reclaimed and network records incrementally improved during the normal course of business. The method relies on the redesigning of suspect services, causing as a by-product the abandonment of suspect resources, both known and unknown, followed by a series of processes for identifying and reclaiming abandoned resources. When repeated, this cycle progressively improves the accuracy of network models and reclaims network assets for productive reallocation.

Most networks have approved maintenance periods arranged with their users to allow for needed periodic changes and upgrades. During these maintenance periods a network service can safely be redesigned using known resources and then can be reactivated and retested. As long as the changes do not require configuration changes on a user-facing service, interface, or circuit end-point, the only user accommodation required should be to discontinue use of the service during the agreed period.

The processes of addressing the problem of suspect resources through network service redesign and then systematically recovering orphan resources can be used to improve the overall accuracy and alignment between a network or portion of a network and the network model that represents it. Because a single suspect resource may appear in more than one network service, several network services may need to be redesigned to fully remove all dependencies on a suspect resource so that it might meet criteria for recovery. Randomly selecting suspect network services, redesigning and re-implementing these sequentially would eventually clear all known dependencies on the suspect resource. However, a more efficient approach is to identify all network services in the network model that include or rely upon a particular suspect resource, then sequentially redesign these services. In some cases, it may be possible to redesign a group of related services in a single step. This organized approach increases the likelihood that the suspect resource can be recovered. This is particularly useful when attempting to expedite recovery of suspect resources at particular locations in a network where capacity is limited. Recovering suspect resources at these locations effectively increases network capacity. A list of network capacity shortages can be used as a prioritized list of where to focus redesign and recovery efforts.

Recovering suspect resources involves risk. Even when all precautions are taken to verify that an orphaned resource is unused and free for recovery, in certain situations it might still be incorporated in some unknown service. This risk can be addressed by tracking orphan resources that are identified for recovery, but leaving them unchanged until specific capacity thresholds are crossed, providing greater immediate benefits of recovery to offset risks.

Over time, the effectiveness of these processes can be measured by tracking how suspect resources compare to confirmed and unconfirmed resources. The concepts and approaches related to aggregate audit state discussed above may also be used to meet this goal.

The process of recovering misallocated assets begins when a network service is identified as being in a suspect state because it contains resources or relationships that have an audit state of suspect. The term "network service" refers to the use of a portion of a network that contains multiple resources to provide a service or a function. Examples would include: a messaging service, a security service, a data transmission service, a long distance voice service, and the like. A network service may provide an entire solution or may simply be a component of a larger solution. A resource may be simultaneously a part of more than one network service. When a resource is in a suspect audit state, the network service to which the resource belongs can be considered suspect. A suspect network service may be redesigned to include only resources that are confirmed as available for assignment (e.g., not currently allocated) and/or resources that were in a confirmed audit state in the suspect service. The service is then reconfigured to match the new design. The functions that a suspect resource was intended to perform are taken over by one or more confirmed resources. The suspect resource is omitted from the reconfigured service and is labeled an orphan. Confirmed resources from the original service that are being reused are reconfigured and any new pool resources are also appropriately configured. The network service and all its changed resources are set to the unconfirmed state and normal audit processes are used to confirm the success of the changes. In most cases, these processes will result in the network service and all its new resources being confirmed (meaning that the actual network and the network model for this network service are aligned). Confirmed resources from the original service that are no longer needed can then be released for other uses.

Resources that were suspect in the original service are not released or reconfigured at this time. Such resources continue to be tracked in the network model as being in a suspect state and may also be recorded as being orphaned resources. This approach is taken because release or reconfiguration of resources that are in the suspect state can cause disruption in a network. The fact that a resource is suspect suggests that its status within the network is unknown. The network model could indicate that a suspect resource is inactive when it is, in fact, still in use but incorrectly recorded in the network model. For example, the redesign and reconfiguration of a network service could result in a resource being omitted from the network service. That resource would then be inactive in that network service but it might still be active in other network services. Releasing or reconfiguring such a resource for other uses could cause an unpredicted network or service outage. Orphans such as these are preferably not released or reconfigured for other purposes until it is definitively established that they are truly inactive.

A series of auditing methods may be periodically and systematically applied to orphaned resources attempting to verify that they are in fact not in use. If sufficient evidence is gained that these resources are not in use, based on a series of business rules, then these resources can be reconfigured and released. The resources can then updated to an unconfirmed state in the network model and can wait for normal audit processes to set them to the confirmed state. If evidence is found that they may in fact be in use, then these resources are left in a suspect state. As examples, the following specific auditing methods can be used to determine whether and when suspect orphaned resources can safely be released and returned to inventory for reassignment.

First, resources that are regularly monitored for usage can be checked to determine whether any traffic is currently or has recently been transmitted through the resource after redesign. An orphaned resource that has carried no traffic for an extended time can be assumed to be no longer in use and can be safely removed from service. Similarly, if an orphaned resource allows for the blocking of traffic, it can be quarantined for an extended time so that no traffic passes through it. Quarantining a resource involves disabling the activity of the resource without releasing it for other uses or removing the resource from the network model. If no disruption in the network or a network service occurs due to the quarantine, it is likely that the resource is truly inactive. Also, a resource can be released but held logically in a quarantine list that prevents it from being reallocated for some policy-based period of time. If disruption results, the resource can be quickly returned to its former configuration. If no disruption in network or network service is observed after a specific period, the resource can be returned to the available pool.

Also, many transmission technologies specify that sympathetic alarms be generated by each resource along the path of the circuit if some point along the path is incapable of transmitting traffic. Alarms are propagated along the service path in specific ways. This feature is important for isolating failures. In this case, orphaned resources that are truly inactive behave identically to resources along a broken service path. An inactive resource can remain in an alarm status indefinitely. Thus, an analysis of the long-standing alarm patterns in a network can provide evidence of which resources can be released back to inventory for reallocation. Before these resources are released, several other checks are typically performed. Alarm patterns should be continuous and long-standing in most cases, as transient network issues may make active, yet misallocated resources appear to be available for recovery. The resource in question should have no evidence of recent maintenance or troubleshooting activity. This would include recent or open trouble reports, recent element change records, inclusion in major maintenance activities, emergency re-routes, or evidence of recent testing. Many of these activities may result in transient alarms that can mask the active role of a resource in a service. Thus, there are preferably long-standing alarm patterns and an absence of maintenance or troubleshooting activities for a significant period of time before an orphaned resource is declared as ready for recovery.

Elements are sometimes placed in a loop-back configuration to quiet alarms. Such configurations can be found by querying the loop-back status of network resources, a part of a regular auditing regime. Alternatively, an explicit test signal can be placed on the service. If a test signal is reflected back from an element to its source, it can be assumed that the element is in a loop-back configuration. Thus, where a resource has apparently been in a loop-back configuration for a period of time and there is an absence of maintenance or troubleshooting activities which might provide a basis for the loop-back configuration, one may conclude that the element is inactive and can be reconfigured or released for other uses.

Finally, when the above methods are inadequate to determine whether selected resources that appear inactive in a network model are truly inactive, a technician can directly intervene (possibly by one on one inquiries through a computer interface or command line interface) or even physically inspect the network for inactive resources. While this method is often expensive and potentially prone to error, it can be justified if resources can be reclaimed from the network and put to other uses. This is especially true if capacity constraints would otherwise force the acquisition of additional network resources, often at significant cost.

This general approach for recovery of orphaned network resources may, in one embodiment, be specifically applied to recover Time Division Multiplexed resources. The misalignment of a network and a network model is a common problem found in widely used Time Division Multiplexed transmission services based on older point-to-point dedicated circuit technology like the Digital Signaling Hierarchy (DSH), including DS0, DS1, and DS3 circuits hosted on digital cross-connect switches or digital multiplexers. Several methods for exchanging transmission resource information between end points of a digital link are possible, for example, using extra bits within protocol header information to exchange end point identity and descriptive information. However, some transmission protocols do not provide standard methods for implementing such exchanges, so auditing and verifying the linkage between elements often relies on the use of intrusive testing. This usually requires coordination with and permission of the circuit user because the circuit may become unusable during testing. In cases where errors have been made in documenting the links between elements in the network model, field investigation may be required to correct the problem.

An embodiment of the orphaned network resource recovery process is illustrated in FIG. 1. The process begins by identifying an audit state for each resource of a network service that is included in a network model wherein the possible audit states comprise confirmed, unconfirmed, and suspect, as shown in box 8. The audit state for each resource is stored and the stored audit state is couple with information regarding the resource associated with the network model, as shown in box 9. A network service is identified as suspect, as shown in box 10. The network service is then redesigned to include only confirmed resources and to omit suspect resources, as shown in box 12. The network service is reconfigured to match the redesign in box 14. In box 16, all resources with a confirmed audit state that are not used in the reconfigured network service are released and made available for reuse. In box 18, all resources with a suspect audit state that are not used in the reconfigured network service are identified as orphans. In box 20, the orphan recovery procedures described above, such as monitoring network traffic, quarantining a resource, monitoring network alarms, and monitoring the loop-back status of a resource, can be performed. These procedures are intended to determine whether the orphan is truly inactive. These procedures may be automated, requiring little direct intervention other than initiating the procedure as a whole or initiating separate instances of the procedure, or they may be more directly manually driven or controlled and monitored. As shown in box 22, three paths can be followed based on the results of the orphan recovery procedures. If an orphan is found to be inactive, it can be reconfigured or released and be confirmed as available for allocation into a new service, as shown in box 24. If it is not found to be inactive, that is, if the orphan is still performing some function in another network service, then it is left unchanged, as shown in box 26. If the orphan recovery procedures are unable to determine whether or not the orphan is inactive, then a physical inspection of the network, as shown in box 28, is performed. Then, in box 30, a determination is once again made as to whether or not the resource is inactive. If the physical inspection finds that the orphan is inactive, then it can be reconfigured or released for other uses, as shown in box 24. If it is not inactive, it is left unchanged, as shown in box 26.

While the terms "confirmed", "unconfirmed", and "suspect" have been used throughout this document to describe the audit states, one of skill in the art will recognize that the audit states are not restricted by this language. Equivalent terms representing similar states or functions could be used to describe the audit states.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method of recovering orphaned network resources in a network service having a network model comprising:
   identifying an audit state for each resource of the network service that is included in the network model wherein the possible audit states comprise confirmed, unconfirmed, and suspect, wherein the confirmed audit state indicates that evidence has been gathered for a resource of the network service that verifies the accuracy of the network model, the suspect audit state indicates that evidence has been gathered for a resource of the network service that challenges the accuracy of the network model, and the unconfirmed audit state indicates that no evidence has yet been gathered to indicate a resource of the network service as confirmed or suspect;
   storing the audit state for each resource and coupling the stored audit state information with information regarding the resource associated with the network model;
   in response to the audit state of at least one resource of the network service being identified as suspect, redesigning the network model of the network service using only resources with the confirmed audit state;
   reconfiguring the network service to correspond with the redesigned network model;
   making available for reuse resources with the confirmed audit state that were not used in the reconfigured network service; and
   identifying as orphans resources that had the suspect audit state in the network service before the reconfiguration of the network service and that are not used in the reconfigured network service.

2. The method of claim 1 wherein orphan recovery procedures are performed on the orphans.

3. The method of claim 2 wherein orphan recovery procedures are selected from a group of procedures comprising:
   monitoring network traffic through the orphan;
   quarantining the orphan;
   monitoring alarm patterns related to the orphan; and
   checking the loop-back status of the orphan.

4. The method of claim 3, wherein the orphan recovery procedure of monitoring alarm patterns related to the orphan further comprises monitoring maintenance and troubleshooting activities related to the orphan.

5. The method of claim 3, wherein the orphan recovery procedure of checking the loop-back status of the orphan further comprises checking maintenance and troubleshooting activities related to the orphan.

6. The method of claim 3 wherein orphan recovery procedures include each of a group of procedures comprising:
   monitoring network traffic through the orphan;
   quarantining the orphan; and
   monitoring alarm patterns related to the orphan.

7. The method of claim 6 wherein the orphan recovery procedures are automated orphan recovery procedures.

8. The method of claim 2 wherein orphans that automated orphan recovery procedures determine to be inactive are made available for other use.

9. The method of claim 2 wherein orphans that orphan recovery procedures determine to be active are left in service.

10. The method of claim 9 further comprising:
    identifying another network service to which an active orphan belongs;
    redesigning a network model of the other network service without the orphan;

reconfiguring the other network service to correspond with the redesigned network model of the other network service without the orphan;

performing orphan recovery procedures on the orphan; and making the orphan available for other use when orphan recovery procedures determine the orphan to be inactive and leaving the orphan in service when orphan recovery procedures determine the orphan to be active.

11. The method of claim 10 wherein the method is repeated until the orphan is made available for other use.

12. The method of claim 6 further comprising direct one-to-one intervention to inspect orphans that automated orphan recovery procedures cannot determine to be active or inactive.

13. The method of claim 6 further comprising performing a physical inspection of orphans that orphan recovery procedures cannot determine to be active or inactive.

14. The method of claim 2 further comprising performing a physical inspection of orphans that orphan recovery procedures cannot determine to be active or inactive.

15. The method of claim 14 wherein orphans that physical inspection determines to be inactive are made available for other use and orphans that physical inspection determines to be active are left in service.

16. A method of recovering orphaned network resources in a network having a network model comprising:

identifying an audit state for each resource of network services that are included in the network model, wherein the possible audit states comprise confirmed, unconfirmed, and suspect, wherein the confirmed audit state indicates that evidence has been gathered for a resource of the network service that verifies the accuracy of the network model, the suspect audit state indicates that evidence has been gathered for a resource of the network service that challenges the accuracy of the network model, and the unconfirmed audit state indicates that no evidence has yet been gathered to indicate a resource of the network service as confirmed or suspect;

storing the audit state for each resource and coupling the stored audit state information with information regarding the resource associated with the network model;

identifying at least one of the network services using at least one resource with the suspect audit state;

redesigning a portion of the network model corresponding with the at least one of the network services using only resources with the confirmed audit state;

reconfiguring the at least one of the network services to correspond with the redesigned portion of the network model;

making available for reuse resources with the confirmed audit state that were not used in the at least one reconfigured network service;

identifying as orphans resources that had the suspect audit state in the network service before the reconfiguration of the at least one of the network services and that are not used in the at least one reconfigured network service; and performing orphan recovery procedures on the orphans.

17. The method of claim 16 wherein orphan recovery procedures are selected from a group of procedures comprising:

monitoring network traffic through the orphan;
quarantining the orphan;
monitoring alarm patterns related to the orphan; and
checking the loop-back status of the orphan.

18. The method of claim 16 wherein the identifying of at least one of the network services using at least one resource with the suspect audit state comprises:

identifying a resource with the suspect audit state being used by a plurality of the network services and identifying all of the plurality of network services using the identified suspect resource;

wherein the redesigning comprises redesigning a first portion of the network model corresponding with a first identified network service of the plurality of network services using only resources with a confirmed audit state; and wherein the reconfiguring comprises reconfiguring the first identified network service to correspond with the redesigned first portion of the network model.

19. The method of claim 18, further comprising individually redesigning and reconfiguring additional identified network services of the plurality of network services that are using the identified suspect resource until the suspect resource is recovered.

20. The method of claim 16 wherein the identifying of at least one of the network services using at least one resource with the suspect audit state comprises:

identifying a resource with the suspect audit state being used by multiple network services and identifying all of the multiple network services using the identified suspect resource;

wherein the redesigning comprises redesigning the portion of the network model corresponding with all of the identified multiple network services using only resources with the confirmed audit state; and wherein the reconfiguring comprises reconfiguring all of the identified multiple network services to correspond with the redesigned portion of the network model.

21. The method of claim 16 wherein the method is repeated until no network services remain which use a resource with the suspect audit state.

22. The method of claim 16 wherein the method is repeated until an aggregate audit state of the network model is below a predefined threshold.

* * * * *